United States Patent [19]
Drexler

[11] 3,764,904

[45] Oct. 9, 1973

[54] MONITOR FOR PHASE SEQUENCE AND LOSS

[75] Inventor: John J. Drexler, Moline, Ill.

[73] Assignee: Montgomery Elevator Company, Moline, Ill.

[22] Filed: Dec. 7, 1970

[21] Appl. No.: 95,803

[52] U.S. Cl. .................................. 324/86, 317/47
[51] Int. Cl. ........................................... G01r 25/00
[58] Field of Search ............... 324/86, 108; 317/48, 317/47

[56] References Cited
UNITED STATES PATENTS

| | | | |
|---|---|---|---|
| 3,495,130 | 2/1920 | Bruner et al. | 317/48 |
| 3,364,363 | 1/1968 | Iordianidis | 317/47 X |
| 3,611,050 | 10/1971 | Weber | 317/48 X |
| 3,428,865 | 2/1969 | Opad | 324/86 X |
| 3,555,417 | 1/1971 | Mitchell | 324/86 |
| 3,302,063 | 1/1967 | Leenhouts | 324/86 X |

Primary Examiner—Alfred E. Smith
Attorney—Hofgren, Wegner, Allen, Stellman & McCord

[57] ABSTRACT

A monitor detects improper phase sequence or phase loss in a three phase system. A thyristor and a series connected relay are directly connected between two line conductors. A network using only two resistors and one capacitor connects all three line conductors to a summing junction connected through a variable resistive path to the gate of the thyristor to continuously actuate the relay when the desired phase sequence rotation is present.

11 Claims, 4 Drawing Figures

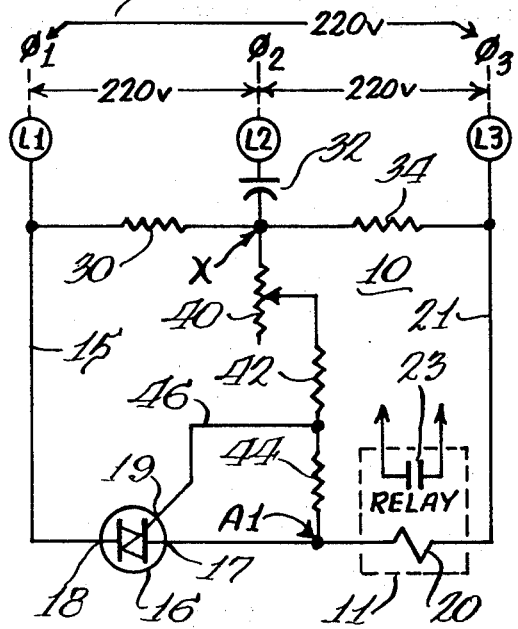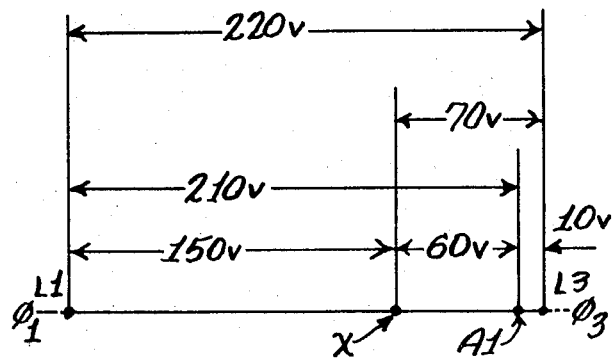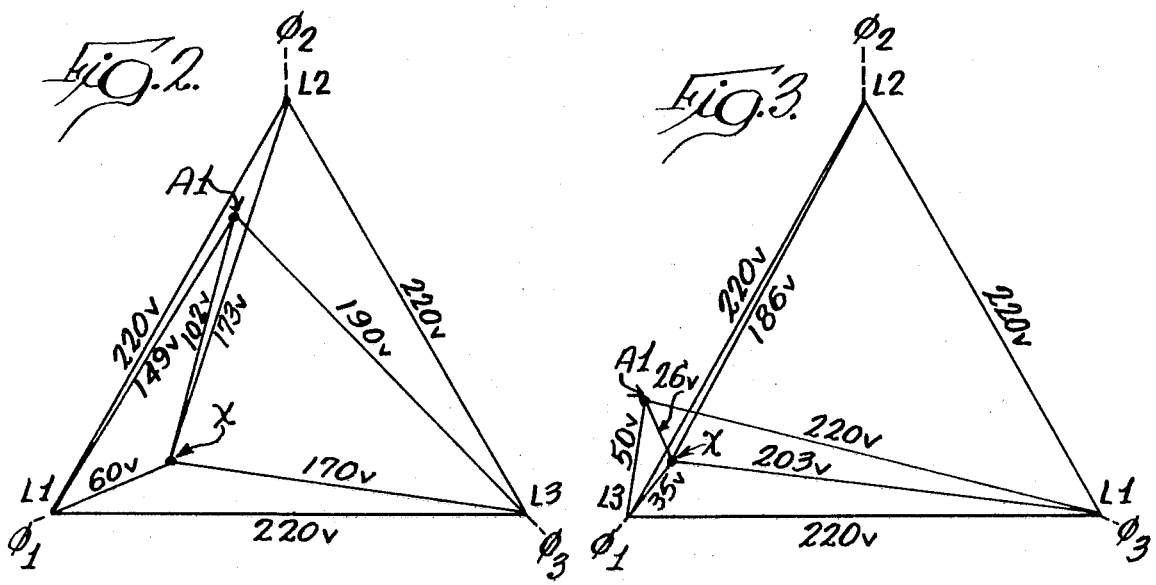

MONITOR FOR PHASE SEQUENCE AND LOSS

This invention relates to a detector or monitor for determining an improper phase sequence and/or a phase loss in a three phase system, and more particularly to a monitor of the above type using a minimum number of components and no inductors other than a relay coil.

Many monitoring circuits are known for determining when the proper phase rotation sequence occurs in three power lines or conductors. Upon detection of an improper phase rotation, or a phase loss, a relay contact is actuated to either signal an error condition, or to automatically enable a correction circuit which reverses an incorrect phase rotation. Such monitoring circuits may be associated with the hoist motor of an elevator, for example, in order that an elevator car will travel in the proper up or down direction.

Prior monitoring circuits have undesirably required a relatively large number of components, or have connected line power through some of the monitoring elements in the circuit, and therefore produce undesirable heating over long periods of time. The latter type circuits are especially undesirable when a relay is to be continuously actuated during a correct phase rotation sequence, and only occasionally deactuated to indicate an improper phase sequence or a phase loss.

In accordance with the present invention, an improved monitoring circuit is provided which overcomes the above disadvantages. The circuit is of extremely simple design and uses a minimum number of components, while still providing accurate phase monitoring with a wide safety factor. The improved circuit can be constructed using only one capacitor and several resistors, and therefore is extremely economical to manufacture. No inductors are utilized, other than a relay coil energized by the monitor circuit. In addition, the relay coil is connected directly through a switching device with two line conductors. No lumped impedance elements are connected in the power circuit for the relay coil, thus eliminating undesirable heating.

One object of this invention is the provision of a monitor for a three phase system, in which a relay coil is connected directly through a switching device across two line conductors. The direct connection is solely by wires, without lumped impedance elements.

Another object of this invention is the provision of a monitor for a three phase system, in which a simple phase detection network is formed using only resistive and capacitive elements, and desirably includes only two resistors and one capacitor.

Further advantages and features of the invention will be apparent from the following description, and from the drawings, in which:

FIG. 1 is a schematic diagram of a monitor circuit;

FIG. 2 is a vector diagram illustrating voltages in the monitor circuit for a proper phase rotation sequence;

FIG. 3 is a vector diagram illustrating voltages in the monitor circuit for an incorrect phase rotation sequence; and FIG. 4 is a vector diagram illustrating voltages in the monitor circuit for a loss of one phase.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated.

Turning to FIG. 1, a monitor circuit 10 continuously actuates a relay 11 when a proper phase rotation sequence occurs on three line conductors L1, L2 and L3. Illustratively, the system is shown connected to a 220 volt, three phase power source having a 60 hertz frequency, and the proper phase sequence for the line conductors L1, L2, and L3 is $\phi 1$, $\phi 2$, and $\phi 3$, respectively.

The circuit which energizes relay 11 includes no lumped impedance elements. The line terminal L1 is connected through a wire 15 directly with a three terminal, bidirectional switching device or thyristor 16, such as a triac, type 40530 bby RCA, having a first anode terminal 17, a second anode terminal 18, and a gate terminal 19 for triggering or gating the device 16 from its nonconductive into its conductive state when the signal between gate terminal 19 and anode 1 terminal 17 exceeds a predetermined voltage, herein approximately 5 volts. A wire connects the anode 1 terminal 17 to a relay coil 20 of relay 11, the opposite side being connected by a wire 21 directly to line terminal L3. The relay may be a type PR11 by Potter-Brumfield, having a 230 volt, 60 hertz relay coil 20. When relay coil 20 is energized, it changes the state of a normally open relay contact 23, thereby closing a circuit for any desired external utilization device.

A phase detector network consists of a minimum member of lumped impedance elements, all desirably noninductive. Preferably, the network consists of a resistor 30, as 33 kilohms, connected between line terminal L1 and a common summing junction X. A capacitor 32, as 0.082 microfarads, is connected between line terminal L2 and the summing junction X. The capacitor 32 has a capacitive reactance of approximately 32,365 ohms at the power frequency of 60 hertz, and therefore its impedance approximately equals the impedance of resistor 30, and the remaining resistor in the network. Namely, resistor 34, as 33 kilohms, is connected between line terminal L3 and summing junction SX.

Between summing junction X and a junction A1 between the switching device 16 and relay coil 20, a solely resistive path is formed by a 50 kilohm variable resistor 40, the wiper of which is connected to a 10 kilohm resistor 42 in series with a 220 ohm resistor 44. The junction between resistors 42 and 44 is connected by a wire 46 directly to the gate terminal 19 of switching device 16. The resistors 40, 42 and 44 form a current path in which at least a predetermined magnitude of current is necessary in order to produce a voltage drop across resistor 44 sufficient to actuate device 16.

In operation, the voltage between junctions X and A1 varies in magnitude dependent upon the phase rotation sequence applied to the line terminals L1, L2, and L3, as shown by the vector diagrams in FIGS. 2–4. When the proper or correct phase rotation sequence occurs, FIG. 2, the phase shift caused by capacitor 32, when summed with the voltages through the resistors 30 and 34, results in a voltage difference between junction X and A1 of approximately 102 volts, producing a greater than 5 volt drop across resistor 44. The variable resistor 40 serves as a sensitivity control for firing the thyristor 16, and is adjusted to compensate for various magnitudes of three phase voltage applied to the terminals L1, L2 and L3. Resistor 42 serves as a limiter for the maximum voltage which may be developed across the resistor 44.

With an incorrect phase rotation sequence such as $\phi 3$, $\phi 2$ and $\phi 1$ for terminals L1, L2, and L3, respectively, the resulting voltages are illustrated in FIG. 3. The voltage difference between junctions X and A1 now decreases to 26 volts, resulting in a current flow through resistor 44 insufficient to produce the necessary gating voltage. Thyristor 16 becomes deactivated, thereby open-circuiting the power path to line 15. The current path from the remaining terminals L1 and L2 through the respective lumped impedance elements to junction A1 does not produce a current through relay coil 20 which is sufficient to actuate the relay contact 23.

When the phase $\phi 2$ is lost, the resulting vector voltages are illustrated in FIG. 4. The voltage difference between junctions X and A1 drops to approximately 60 volts, thereby producing a current flow through resistor 44 which is not sufficient to actuate the thyristor 16. Again, the current path through the resistors 30, 40, 42 and 44 between line terminal L1 and junction A1 has a high impedance which prevents the remaining phase $\phi 1$ from actuating the relay coil 20. It will be apparent that if one of the other phases $\phi 1$ or $\phi 3$ is lost, power is disconnected from the power circuit in series with relay coil 20 and thyristor 16, with the consequence that relay coil 20 again becomes deenergized. Although a very small current can flow through the remaining lumped impedance elements, again the current is not sufficient to actuate the relay coil 20.

It can thus be seen that the monitor circuit 10 is of very simple design, and uses one capacitor, a minimum number of resistors, and no inductors. Also, no transformers are necessary, as have commonly been necessary in prior circuits.

I claim:

1. In a three phase system having three line conductors with a desired relative phase rotation sequence, a monitor for detecting an improper phase sequence or a loss of phase, comprising:
   switching means including thyristor means in series with relay means energized when the thyristor means is in a conductive state and there is no loss of phase in said three phase system for indicating the occurance of the desired relative phase rotation sequence, the deenergization of said relay means indicating an improper phase sequence or a loss of phase;
   conductor means connecting said switching means directly between a pair of said three line conductors to cause said relay means to be energized by current flowing through the thyristor means from a pair of phases of said three phase system, said conductor means containing no lumped impedance elements; and
   network means for actuating said thyristor means to said conductive state, including common means coupled to said thyristor means and developing an enabling signal having a predetermined absolute magnitude during said desired relative phase rotation sequence and a lesser absolute magnitude during said improper phase sequence or said loss of phase, said lesser absolute magnitude being insufficient to gate said thyristor means to said conductive state, first lumped impedance means coupled between a first of said line conductors and said common means, second lumped impedance means coupled between a second of said line conductors and said common means, and third lumped impedance means coupled between a third of said line conductors and said common means, at least one of said lumped impedance means providing a reactive impedance, said impedance means having values to develop said predetermined absolute magnitude when said desired relative phase rotation sequence is present.

2. The monitor of claim 1 wherein said at least one lumped impedance means comprises a capacitor providing a capacitive impedance, and the remaining lumped impedance means comprise resistors providing a resistive impedance.

3. The monitor of claim 1 wherein said common means includes resistor means coupled to a junction between said series connected thyristor means and relay means, the voltage drop across at least a portion of said resistor means forming said enabling signal.

4. The monitor of claim 4 wherein said resistor means includes a fixed resistor in series with a variable resistor, the voltage drop across said fixed resistor forming said enabling signal, said variable resistor having different selectable resistance values to form a sensitivity control.

5. In a three phase system having three line conductors with a desired relative phase rotation sequence, a monitor for detecting an improper phase sequence or a loss of phase, comprising:
   switching means having a gate electrode and actuated when a predetermined gating signal is present at said gate electrode;
   a summing junction;
   noninductive impedance means coupled between said summing junction and said gate electrode to pass a gating signal to the switching means; and
   network means for coupling said summing junction to each of said three line conductors, comprising
   first resistive means coupled between said first line conductor and said summing junction,
   capacitive means coupled between said second line conductor and said summing junction, and
   second resistive means coupled between said third line conductor and said summing junction.

6. The monitor of claim 5 wherein said three phase system has a predetermined frequency, the resistance values of said first and second resistive means and the capacitance value of said capacitive means being selected to produce approximately equal impedances at said predetermined frequency.

7. The monitor of claim 6 wherein said first resistive means comprises a single resistor, said second resistive means comprises a single resistor, and said capacitive means comprises a single capacitor.

8. The monitor of claim 5 wherein said noninductive impedance means comprises solely resistive means.

9. In a three phase system having three line conductors with a desired relative phase rotation sequence, a monitor for detecting an improper phase sequence or a loss of phase, comprising:

three terminal switching means having first and second terminals with conductive and nonconductive states therebetween under control of a gate signal at a control terminal;

relay means for changing the state of contact means when a predetermined current is coupled through a relay coil;

conductor means connecting said first and second terminals and said relay coil in series between a pair of said three line conductors;

means for summing the three relative phases including a first resistive means connected to a first of said line conductors, capacitive means connected to a second of said line conductors, and a second resistive means connected to a third of said line conductors;

resistive means connected between said summing means and said conductor means to develop at a junction therein a voltage drop proportional to current flow through the resistive means; and noninductive means for connecting said control terminal to said junction in said resistive means.

10. The monitor of claim 9 wherein said voltage drop exceeds a predetermined switching value when said desired relative phase rotation occurs at said three line conductors, said voltage drop gating said switching means into said conductive state to cause said conductor means to pass said predetermined current to said relay coil, whereby the changed state of said contact means indicates the occurrence of the desired relative phase rotation sequence.

11. The monitor of claim 10 wherein said resistive means includes a variable resistor manually adjustable to difference resistance values to change the voltage drop at said junction, said variable resistor forming a sensitivity control.

* * * * *